United States Patent [19]
Boys et al.

[11] Patent Number: 5,821,638
[45] Date of Patent: Oct. 13, 1998

[54] FLUX CONCENTRATOR FOR AN INDUCTIVE POWER TRANSFER SYSTEM

[75] Inventors: John Talbot Boys; Andrew William Green, both of Auckland, New Zealand

[73] Assignee: Auckland UniServices Limited, Auckland, New Zealand

[21] Appl. No.: 633,728

[22] PCT Filed: Oct. 20, 1994

[86] PCT No.: PCT/NZ94/00114

§ 371 Date: May 16, 1996

§ 102(e) Date: May 16, 1996

[87] PCT Pub. No.: WO95/11544

PCT Pub. Date: Apr. 27, 1995

[30] Foreign Application Priority Data

Oct. 21, 1993 [NZ] New Zealand ........................... 250024

[51] Int. Cl.[6] .................................................. H01F 41/00
[52] U.S. Cl. .......................... 307/104; 336/178; 336/212; 336/233
[58] Field of Search ..................... 307/104, 17; 336/175, 336/184, 186, 187, 188, 200, 205, 206, 212, 233, DIG. 3

[56] References Cited

U.S. PATENT DOCUMENTS

| | | | |
|---|---|---|---|
| 1,297,126 | 3/1919 | Elmen | 336/233 |
| 1,297,127 | 3/1919 | Elmen | 336/233 |
| 1,669,644 | 5/1928 | Andrews | 336/233 |
| 2,942,218 | 6/1960 | Attewell | 336/233 |
| 2,982,948 | 5/1961 | Brownlow | 336/233 |
| 3,535,200 | 10/1970 | Bergstom | 336/233 |
| 3,765,082 | 10/1973 | Zyetz | 336/233 |
| 4,138,783 | 2/1979 | Portier | 336/212 |
| 4,205,288 | 5/1980 | Lin et al. | 336/233 |
| 4,506,248 | 3/1985 | Lin | 336/233 |
| 4,520,556 | 6/1985 | Pasko | 336/212 |
| 4,660,139 | 4/1987 | Nellen | 336/180 |
| 5,293,308 | 3/1994 | Boys et al. | 336/178 |
| 5,371,486 | 12/1994 | Yamada | 336/212 |
| 5,422,519 | 6/1995 | Russell | 307/104 |
| 5,450,305 | 9/1995 | Boys et al. | 363/24 |
| 5,528,113 | 6/1996 | Boys et al. | 336/178 |

*Primary Examiner*—William M. Shoop, Jr.
*Assistant Examiner*—Peter Ganjian
*Attorney, Agent, or Firm*—Young & Thompson

[57] ABSTRACT

A flux concentrator 1300 for an inductive power transfer system is made up from rectangular fingers 1301 of ferrite material held in close contact by compression means to form a large shock resistant core. The fingers are positioned at right angles to a primary conductor 1312 to concentrate the horizontal component of the magnetic flux through the flux concentrator. The fingers include bridge sections 1309 adapted to support pick-up coil windings 1307. The flux concentrator is covered by a conducting sheet of aluminum 1311 on the side of the magnetic core far away from the source of magnetic flux.

12 Claims, 8 Drawing Sheets

FLUX CONCENTRATOR FOR AN INDUCTIVE POWER TRANSFER SYSTEM

BACKGROUND OF THE INVENTION

This invention relates to the field of inductive power transfer for loosely coupled combinations and in particular to means to enhance the collection of said power at the receiving side.

DESCRIPTION OF THE RELATED ART

Inductive power transfer is capable of providing electric power across a significant space to often moving apparatus without a physical connection for the electricity (such as sliding or rolling contacts). It can be carried out at low or high frequencies, in a loosely or a tightly coupled configuration, and with or without magnetically permeable materials.

We have described such a system in our U.S. Pat. No. 5,293,308 (and in the corresponding International application filed as PCT/GB92/0220).

Advantages of the preferred loosely coupled inductive power transfer means over various tightly coupled transfer arrangements include that:

(a) Effective transfer is possible across a larger space, thus the primary and the secondary need not be constrained in space to move within such close limits.

(b) The larger area results in a lower peak power density or a less tightly focused field to carry power, which is less hazardous and places less stress on components or on incidental objects within the flux field.

(c) The pick-up coil need not surround the primary conductor so a system can be constructed in which a flat receiving surface containing secondary windings may be brought near another flat surface containing one or more embedded transmitting (primary) conductors, so permitting much freedom of movement for vehicles over a roadway, for example.

(d) Useful power control means applied to the secondary side may be implemented by shorting the secondary coil (which is generally a resonant inductor) without material effect on currents in the primary side. A shorted secondary coil has little effect on primary current flow, so unaffected primary current can reach another consumer further from a power supply.

Exploiting the above advantages of loosely coupled inductive power transfer systems to utilise IPT in an optimised way uncovers the inherent disadvantages between loosely and tightly coupled systems, mainly that the available power may be limited and that secondary pick-up coils are large, expensive, have unnecessary ohmic resistance, and have large magnetic fields of their own when in use. Means to make the transfer process more effective across wider gaps are required and therefore there is a need to enhance the ability of secondary windings to collect as much of the available flux as possible.

Definitions

IPT is used as an abbreviation for "inductive power transfer".

A tightly coupled pair of inductors exhibit a close correspondence or ratio between current in one and in the other. Substantially all of the magnetic flux generated by current in one inductor is coupled to the second inductor. An example is the relationship between windings in a power transformer. Thus a shorted turn in a typical power transformer secondary causes large and usually damaging currents to flow in the primary winding.

A loosely coupled pair of inductors do not exhibit a close correspondence. Only a portion of the flux emanating from the primary conductor passes through the secondary conductor. Changes in the induced current in the secondary inductor has only a small effect in the primary inductor.

A primary winding is one which generally acts as a source of magnetic flux, some of the flux intersecting the windings of a secondary winding which then passes the power onwards for consumption. The direction of power transfer is of course reversible. In this specification we use the names primary and secondary to refer to the usual direction of power flow.

SUMMARY OF THE INVENTION

It is an object of the present invention to provide an improved means for the transfer of electric power across a gap by inductive means, or one which will at least provide the public with a useful choice.

In one aspect the invention provides an inductive power pick-up means comprising a secondary conductor capable of collecting power from an inductively powered primary conductor characterised-in-that the secondary conductor comprises one or more pick-up coils, each coil being mounted on a ferromagnetic flux concentrator adapted for capturing flux lines and feeding them through the core of each pickup coil.

Preferably the ferromagnetic flux concentrator comprises an elongate mass of magnetically permeable material having a main face substantially parallel to a primary conductor, said mass having a length, a width, and a height, wherein said mass is mounted on said support so that in use the length of the mass of magnetic material is substantially at right angles to said primary conductor to concentrate the horizontal component of the magnetic flux through the flux concentrator.

Preferably the magnetic core comprises one or more ferrites having a relative permeability of 1000 or greater.

Preferably the magnetic core is capable of undergoing distortion without permanent loss of function.

More preferably the magnetic core is composed of a ferrite material, provided as a modular array comprising at least four fingers of material, each finger having at least one shaped side, the fingers being laid side by side along the length of the elongate mass in an array with these shaped sides held in close contact with each other by a compliant force exerting a compression force along the length of the array, so that the permeability of the array is substantially similar to that of an equivalent single mass of the ferrite material.

Preferably the shaped sides are substantially optically flat.

Optionally more than one pick-up coil is provided on a single core.

In a particularly preferred form of the invention a conducting sheet is positioned on the side of the magnetic core away from the source of magnetic flux.

Preferably each pick-up coil is tuned with its own resonating capacitor and each has its own rectifier so that a DC output can be taken from it.

BRIEF DESCRIPTION OF THE DRAWINGS

The following is a description of a preferred form of the invention, given by way of example only, with reference to the accompanying diagrams.

DESCRIPTION OF THE PREFERRED EMBODIMENT

In our loosely coupled inductive power transfer (IPT) systems, we prefer to use certain strategies (a–d):

(a) Alternating Currents of Medium Frequency

Using presently available semiconductor switches it is possible to generate effective power at around 10 KHz and while higher frequencies would result in more compact IPT systems, losses within tuning capacitor dielectrics, switching-duration delays and the generation of radio-frequency interference becomes more likely. Hence, at present 10 KHz is the center of the preferred frequency range. Furthermore we prefer to use reasonably pure sine waves; that is, alternating currents having a low harmonic content, as these radiate less electromagnetic interference and dissipate less energy than do waveforms with added harmonics.

(b) A Primary Conductor Carrying Resonant Current

This provides a higher circulating current than that actually passing through the semiconductor switches which provide the power at any moment, and enhances the sine-wave nature of the circulating current. A typical primary Q is of the order of 3, in a lightly loaded state, where Q represents the ratio of the energy stored in a resonant circuit to the energy lost from the circuit. We also prefer to use a heavy litz wire to carry the primary current as this type of wire provides a good ratio of surface (skin) to volume. In its most commonly used form, the primary conductor laid out along or within a substrate is formed as a closed loop with the outward wire running parallel to the return wire at a reasonably constant spacing, although other configurations such as open loops are possible. In order to extend the length of track that can be driven with a limited voltage we use pi-coupling and zero-inductance coupling methods as described in our PCT applications published as WO93/23908 and WO93/23909.

(c) A Secondary Conductor (Pick-up Coil) Also Carrying Resonant Current

Again we prefer to use litz wire for the windings and as a typical secondary Q is of the order of 10 a significant secondary current can flow in the pick-up coil and through its resonating capacitor.

(d) Secondary Power Control Means

We have found that one convenient way to control circulating current, which if too high can interfere with propagation of primary current, is to short out the secondary coil. Only a small quantity of electricity is dissipated at the moment of shorting or while being shorted, in a loosely coupled IPT system. The shorting action is typically under the control of a controller seeking to provide a steady voltage, so that if the (usually rectified) output voltage available at a certain load is in excess of a first threshold value the coil is shorted until the output voltage is under a second threshold value. In this way, the resonating current in a secondary coil does not rise to high levels if the consumption of power from it happens to be light.

Figure 1:
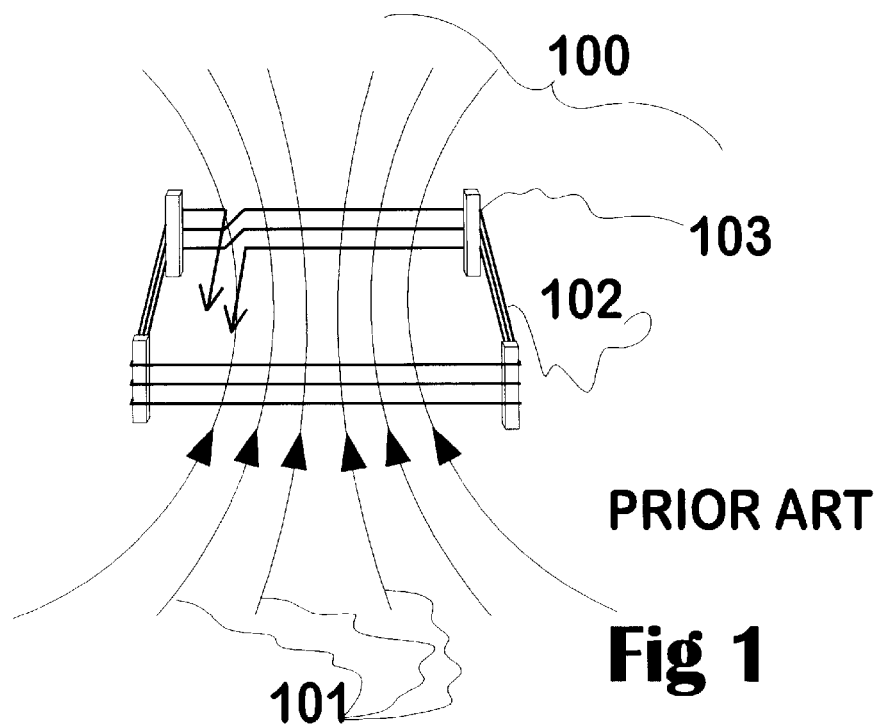
FIG. 1: is an illustration of a prior art inductive power transfer arrangement using a vertical field.

Originally we used a relatively large coil 100 (FIG. 1; prior art); having its axis orientated vertically (assuming a vehicle operating on a substantially flat surface) and wound on a low-permeability former 103 (equivalent to an "air-cored" coil) to pick up the flux 101 from the primary conductor 102 relying on a reasonable length of parallel conductors to intersect a useful amount of flux. While an air core is unsaturable its permeability is only one. The preferred form of this invention is concerned with means to overcome several problems associated with that approach, including that as the pick-up coil is inherently large its series resistance is significant, leading to power dissipation and inefficiency, and that its physical size is inconvenient and leads to wastage of resources. In addition those portions of the pick-up coil bridging between the actively collecting portions that run parallel to the primary conductor are not used to pick up flux and in a sense are wasted copper.

Figure 2:
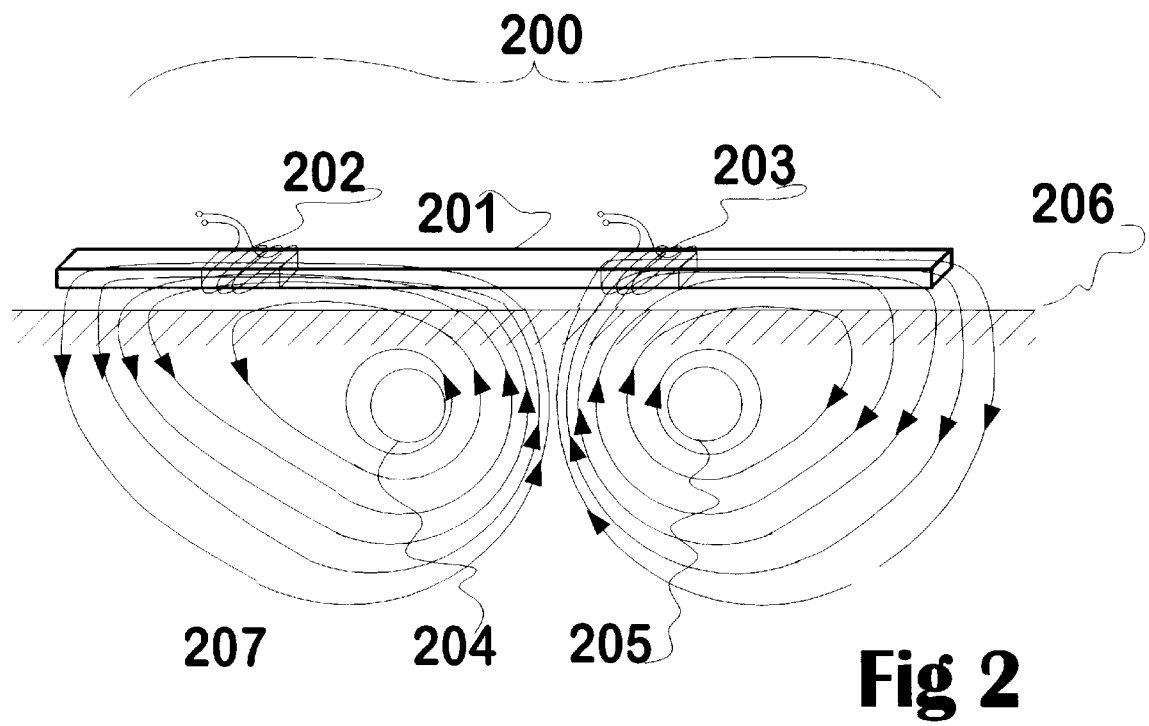
FIG. 2: is an illustration of a ferrite core according to the present invention, using a horizontal field from conductors below a surface.
Figure 3:
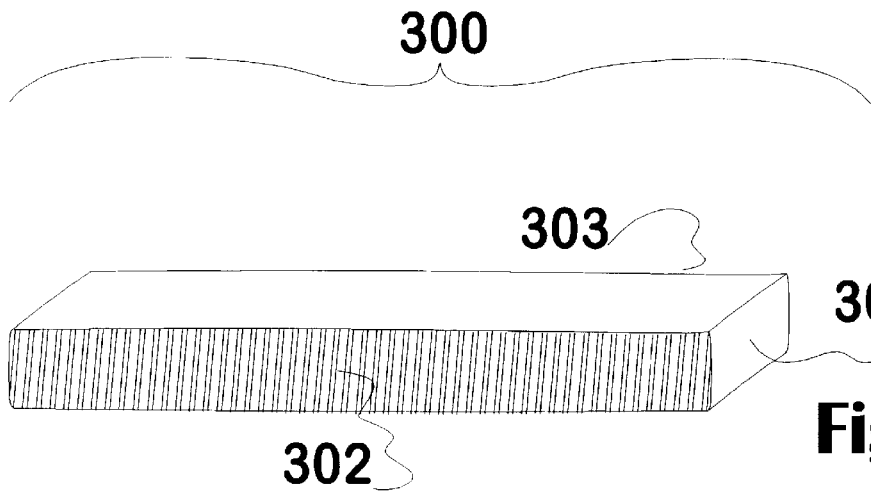
FIG. 3: is art illustration of a ferrite module or finger of the present invention.

FIG. 2 illustrates at 200 a magnetizable core 201 in use to "trap" magnetic flux surrounding a conductor loop 204, 205 beneath a surface 206 within wound coils 202, 203.

The invention will now be described in general terms with reference to FIGS. 10–14, then in more detail with reference to FIGS. 1–9.

EXAMPLE 1

Figure 10:
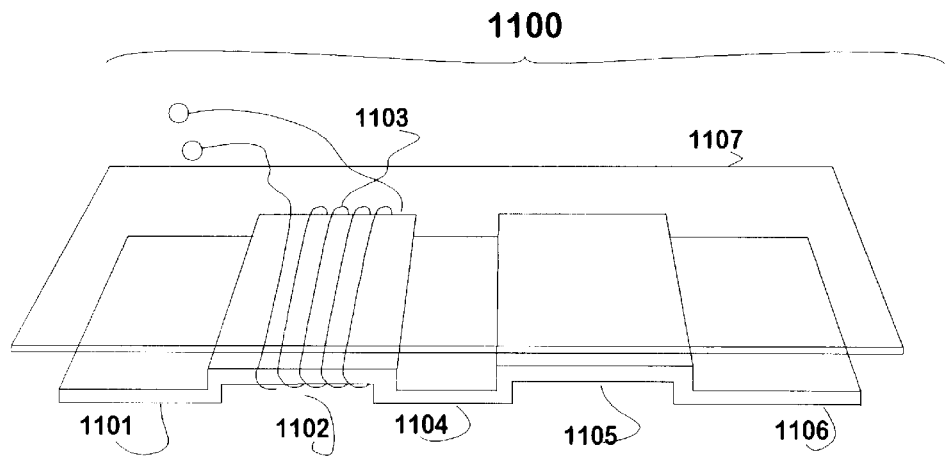
FIG. 10: is an illustration of the present invention in principle; in an idealised, solid-ferrite form.

It has surprisingly been found that an arrangement as shown conceptually at 1100 in FIG. 10, essentially consisting of a large sheet of ferrite oriented more or less tangentially to the direction of current flow, or in other words, in a plane that would intersect along the length of the conductor were it not shifted away at right angles from the conductor, acts as a flux collector and is capable of channeling flux from a relatively large space about the primary conductor through one or more relatively small secondary coils. A suitable ferrite would be cheap, have a relatively large saturation point, and would have low losses at the operation frequency. The secondary coil has no "waste copper" bridging gaps between active pickup areas—a problem in air-only rectangular coils.

Advantages of this flux collector in inductive power pickup applications include that, as the spacing and orientation of the vehicle (see FIG. 13) is not closely constrained, it is possible to lay an array of conductors beneath a roadway to allow powering of vehicles whether they are proceeding in a direct path or involved in passing or parking maneuvers or the like. Therefore this application provides for the electric powering of vehicles from stationary power sources without unduly altering driving styles. Furthermore, the relatively high frequency of the power provided in the primary conductors (ca 10 KHz) eliminates the need for ferromagnetic aids at the primary side—as used in 120 Hz installations. Simple slits cut as parallel pairs in the roadway with a diamond saw or the like, to accommodate the preferred litz wire array, are all that are needed.

In a warehouse, an inductively powered vehicle used for shifting goods may pick up power from anywhere if an array of cables carrying primary inductive current is laid over the floor.

In FIG. 10 the entire ferrite sheet is 1101–1104–1106, wherein the raised portions 1102, 1105 have been raised in order to accommodate the turns of the pickup coil (indicated as 1103) wrapped around the ferrite at that point. An aluminium cover sheet 1107 is applied relatively closely to the upper surface of the ferrite—herein the primary conductors are located beneath the lower surface of the ferrite. The aluminium cover sheet may be made structurally and electrically continuous with an outer skin of the vehicle. It serves to further restrict spread of the flux and to screen the interior of the vehicle from stray induced currents.

Figure 11:
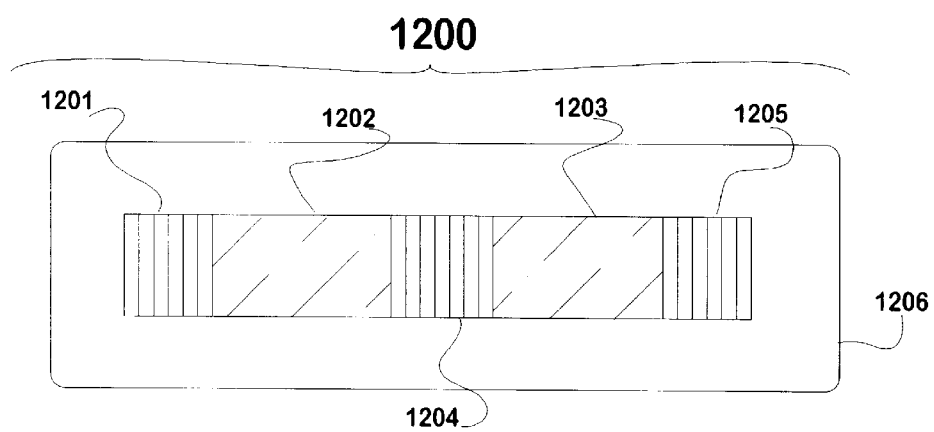
FIG. 11: is an illustration of a preferred embodiment of the present invention constructed from discrete ferrite elements as seen from below.
Figure 12:
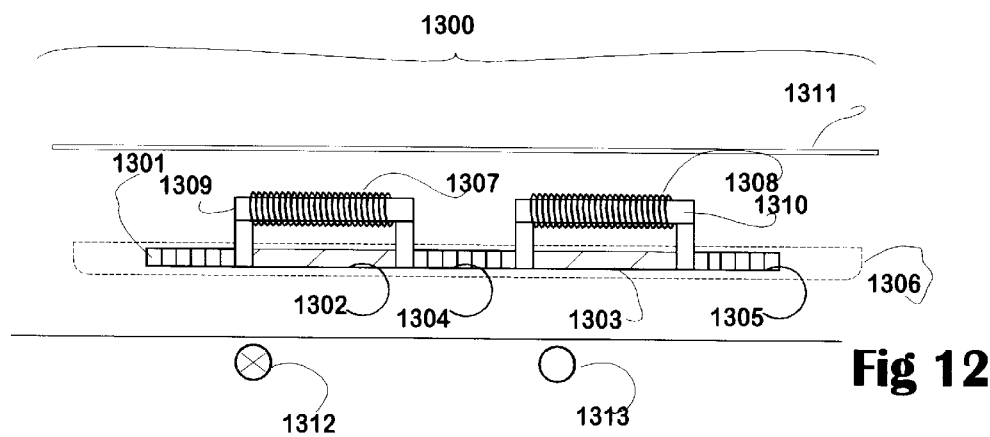
FIG. 12: is an illustration of a preferred embodiment of the present invention constructed from discrete ferrite elements as seen from one end.

A large single sheet of ferrite such as shown in FIG. 10 is a relatively impractical solution. Effective ferrites are extremely brittle and are hard to fabricate as single units in the form shown. A unit cost of at least NZ$4000 is likely. On the other hand, ferrite slabs and bars are already available as standard products and FIGS. 11 and 12 illustrate a preferred embodiment of our "flux concentrator", made from standard slabs and bars (fingers). The advantages of this approach include that the ferrite elements are protected, there is freedom to slip within the ferrite mass if the assembly is distorted, and replacement of individual modular elements is easy, should there be breakage. The unit cost of an assembly made from discrete ferrite elements is of the order of NZ$400. Preferably at least the adjacent surfaces between individual elements of the ferrite elements are finished by grinding so that the adjacent surfaces have little or no air gap between them. Preferably the entire assembly is held in compression by spring pressure from end to end, and by downwards pressure against the bridged from (for example) a sponge rubber sheet or other resilient material.

In FIG. 11, 1200 indicates the entire assembly as seen from below, within a transparent support 1206. In fact a support made from "Tufnol"—a dimensionally stable engineering plastics comprising a resin in which layers of cloth are embedded—is preferred. In any case the support should not be of a material liable to interact with the magnetic flux. The preferred embodiment support comprises a sheet of 15 mm thick "Tufnol" into which a 10 mm deep depression has been milled to accommodate the several arrays of ferrite fingers (1201, 1204, 1205) and two non-magnetic (perhaps "Nylon") spacers (1202, 1203) which underlie the two bridges (1309, 1310 in FIG. 12) carrying the pickup coils. The aluminium backing plate (1107 or 1311; not visible in this view) would preferably be screwed to the sheet 1206 by an array of fasteners. As an alternative to milling, an array of strips may be laminated onto a baseplate and glued or otherwise held in place, or an inert structure may be pressed, cast or otherwise formed from, for example, polycarbonate, polyethyleneterephthalate, or acrylic plastics.

FIG. 12 illustrates the view 1300 from one end of the assembly of FIG. 11. Two primary conductors 1312 and 1313 are indicated. The pickup coils 1307 and 1318 are indicated wrapped around a "bridge" made of ferrite slabs 1309, 1310 which are free to slide over the raised bars at each end but which are pressed downwards against them. In practice the coils would preferably comprise thicker conductor—e.g. litz wire in a bundle of about 5 mm diameter. Also in practice some form of thermal connection between the windings of the coil and the aluminium sheet may be included in order to provide for the dissipation of heat from within the metal of the coil. Sections through ferrite bars or fingers are shown at 1301, 1304, and 1305.

A spring (not shown) may compress the bars along the length of the assembly from one end. One possibility for such a spring is to form the spacers 1302, 1303 out of a resilient material. The overall aluminium cover is indicated as 1311. It may be continuous with the underside of the vehicle, so that this assembly protrudes slightly, or the lower surface of the "Tufnol" or other sheet may be flush or even slightly depressed below the surrounding surface.

It has been found that effective power transfer occurs over primary-to-ferrite spacings of up to 75 mm±25 mm, whereas earlier designs had preferred spacings of only 20 mm, ±10 mm.

Figure 13:
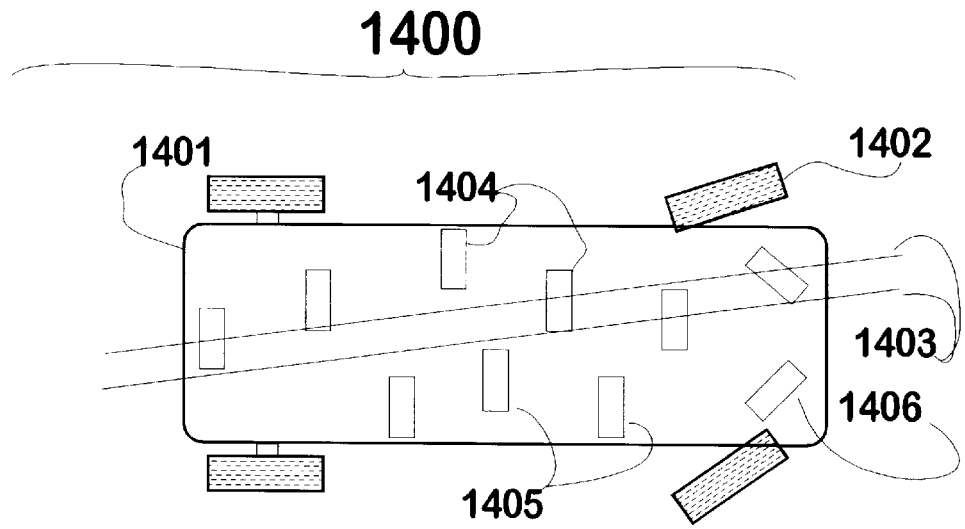
FIG. 13: is an illustration from below of a preferred embodiment of the present invention, comprising a vehicle having ten separate pickup units embedded in the underneath surface adjacent to the road.

FIG. 13 shows at 1400 an underneath view of a vehicle 1401 bearing a number of pickup assemblies or flux concentrators 1404, 1405, 1406; the units 1406 being inclined as they are near the steering wheels 1402. It will be evident that only some of the pickup coils will at a given time be suitably orientated with respect to the pair of primary conductors 1403.

Use of the preferred resonant, or tuned, primary and secondary inductive elements for the sake of greatly improved effectiveness carries the potential disadvantage that any lightly loaded or unloaded secondary resonant coil, because it will then develop a high resonating current within it, will interfere with the primary inductor and effectively prevent the transfer of inductive power to other consumers located further from the position where power is injected into the primary inductor. In effect, a closely coupled and lightly loaded coil terminates the primary inductive pathway at its present position.

In other words, resonant conductors carry greater currents (in proportion to their Q) and so have a greater effectiveness, or ability to transfer inductive power (in a loosely coupled fashion) across a gap. But, in the absence of any load, a secondary resonating coil, which is built so as to have low internal losses, will tend to develop a very high circulating current. The magnetic field generated by this current reaches across the space between the secondary and the primary conductor and induces an opposing voltage within the primary conductor that may become sufficient to block the flow of power along the primary conductor. It may also have other deleterious effects; even possibly forming a biological hazard.

It has been found that this disadvantage may be negated by shorting any lightly loaded pickup coils, thereby halting the flow of resonant currents and causing the coil to resemble a conducting sheet in which only eddy currents may circulate.

An a practical vehicle (or other such installation such as a boat or a people mover (similar to a golf cart); or the like), electronic means is provided to instantaneously and repetitively:

(a) determine which is the most appropriate coil or coils to use for power collection,
(b) to hold, any unused coil or coils in a shorted state, and
(c) to control circulating currents within coils in use by shorting the flowing current from time to time so that the rectified output voltage remains within predetermined limits.

Part (a) is preferably carried out by periodically measuring the short-circuit current from any pickup unit or coil/rectifier assembly, and selecting the one pickup unit (or more, if high power transfer is required) having the highest short-circuit current. This process selects the coil capable of supplying the power at the lowest Q factor; each pickup coil 501 being resonant in combination with its parallel capacitor 502.

Figure 14:
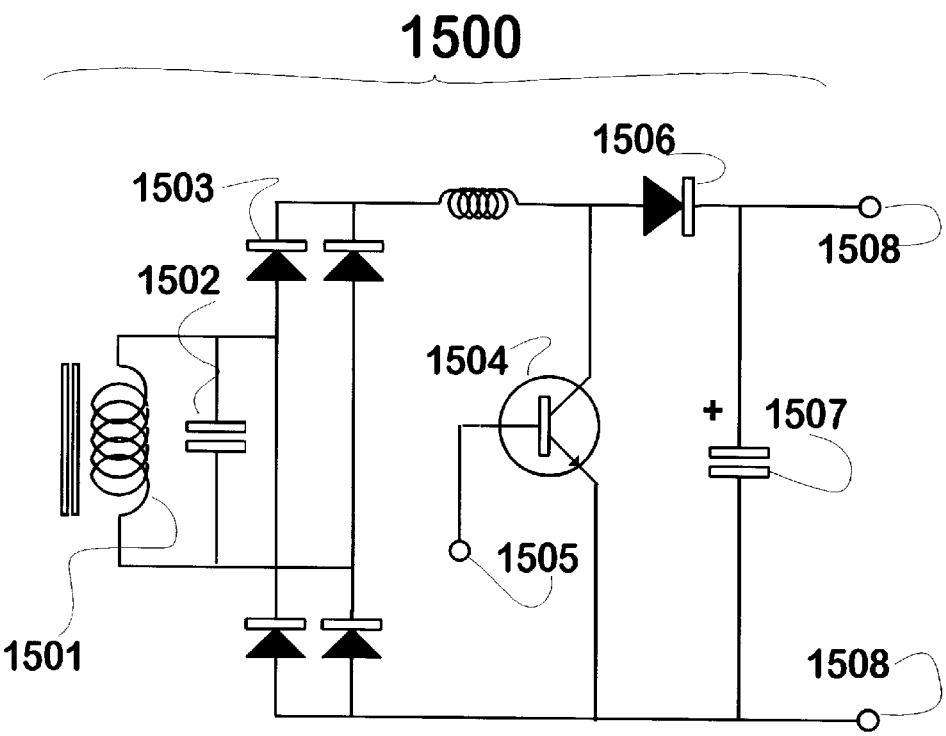
FIG. 14: is an illustration of a preferred embodiment of the present invention showing how a pickup coil within a pickup unit may be controlled.

Parts (b) and (c) may be carried out at each pickup coil by a simple local comparator circuit with hysteresis driving a solid-state switch as illustrated in FIG. 14, or alternatively by electronic means linking all the coils of a vehicle.

The electronic means in question may be integrated into a single digital controller unit including an embedded microprocessor, with gate drivers corresponding to the number of pickup coils as its outputs, and a corresponding number of A-to-D input channels to read voltage outputs as inputs to the microprocessor. The actual design of such a controller will be immediately apparent to a designer skilled in the art of electronic design.

FIG. 14 indicates at 1500 one form of the circuitry that may be used. 1501 is a pickup coil with a preferred ferrite core, and 1502 is a capacitor which together form a resonant or tank circuit. Bridge rectifier 1503 rectifies the resonant current which is smoothed by capacitor 1507 and presented at the output terminals 1508. The solid-state switch (here a NPN transistor 1504 but preferably a low ON-resistance MOSFET device) may be controlled through its gate terminal 1505 and when closed will short the pickup coil 1501. Surprisingly, very little power is dissipated on closing such a switch. A stand-alone controller capable of overcoming the lightly-loaded pickup coil effect typically compares the output voltage with a reference voltage by means of a comparator preferably including some hysteresis, and closes the switch 1504 whenever the output is too high, and conversely opens the switch when the output is too low.

A preferred controller for use with a number of such coils within one installation may use a single embedded microcontroller to manage the entire system, taking voltage measurements from the terminals 1508 and returning control signals to the base/gate input 1505.

EXAMPLE 2

We have made use of materials with a high magnetic permeability to gather or concentrate the available flux into a smaller space, so that the secondary coil can be made smaller (both in its dimensions and in its length) and so that flux can be sucked into the core from a greater area. At the preferred operating frequencies (such as 10 KHz) laminated metal cores and the like exhibit significant losses. We prefer to use ferrites, some preferred types of which have a relative permeability $\mu_r$ of 2000 to 3000.

For our moving vehicle projects, a secondary pick-up unit may be built around a slab of ferrite, for example 30 cm long, 2 cm thick and 10 cm wide. This slab is preferably orientated with its flat face parallel to the length of a primary conductor, and its long axis at right angles to the primary conductor. The pick-up coil is wound closely around the central part of the ferrite slab. Practical units are several times longer and have several coils wound around separate sections (as in FIG. 2) and in use a controller may be instructed to select the most productive coil at any one instant.

As ferrites are a type of ceramic, slabs of this size are quite difficult and therefore expensive to make. They are brittle and may be broken easily during use. An air-filled crack of even 25 microns (¹⁄₁₀₀₀ inch) width will substantially detract from the magnetic advantages of the ferrite. We have therefore developed a type of modular ferrite core which is easy to configure in various sizes, to make (and repair), and which may flex in use without suffering permanent damage.

Our flux concentrator is comprised of a stack of modules held together in a magnetically inert tray by means of spring pressure using a leaf spring or the like exerting pressure along the length of the core.

Each module (see FIG. 3) is preferably a square or rectangular bar 300 of solid ferrite having a length (along the edge 303) equal to the desired width of the ferrite core and a height equal to the desired thickness of the core. The width (from side to side) of each module is of less importance and typically it is the same as the height. A ferrite core is made up by stacking a number of these modules side by side with the precision-ground edges 302 in close contact. Precision grinding is commonly applied to ferrite cores. As internal air gaps detract from the permeability of the assembled ferrite core it is desirable to form the sides of each module so that when one touches another there is substantially no air gap. Preferably any remaining air gap is less than one micron in thickness. Thus the typical surface finish required for the sides 302 of each module is "flat to within one micron over the length of the module" which is not far short of an optically flat surface. A typical price for finished modules according to our requirements is of the order of NZ$4 to $6, and so an example ferrite core using 20 modular fingers may include $80 to $160 of ferrite.

Surfaces other than flat surfaces could be made as long as they mate together, but a flat surface is easier to create and to test for flatness and has no innate polarity or handedness.

Figure 4:
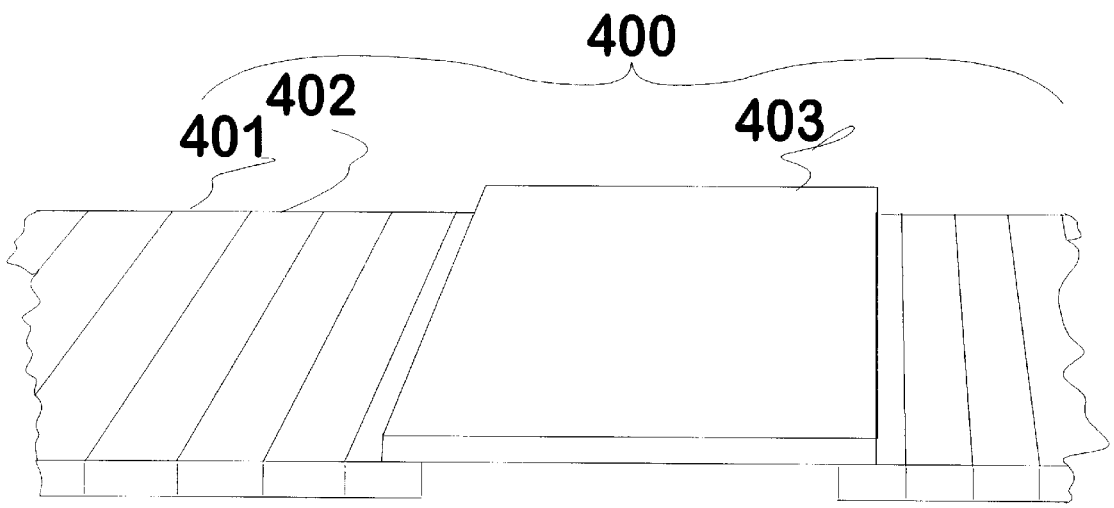
FIG. 4: is an illustration of a ferrite core assembly of the present invention.
Figure 5:
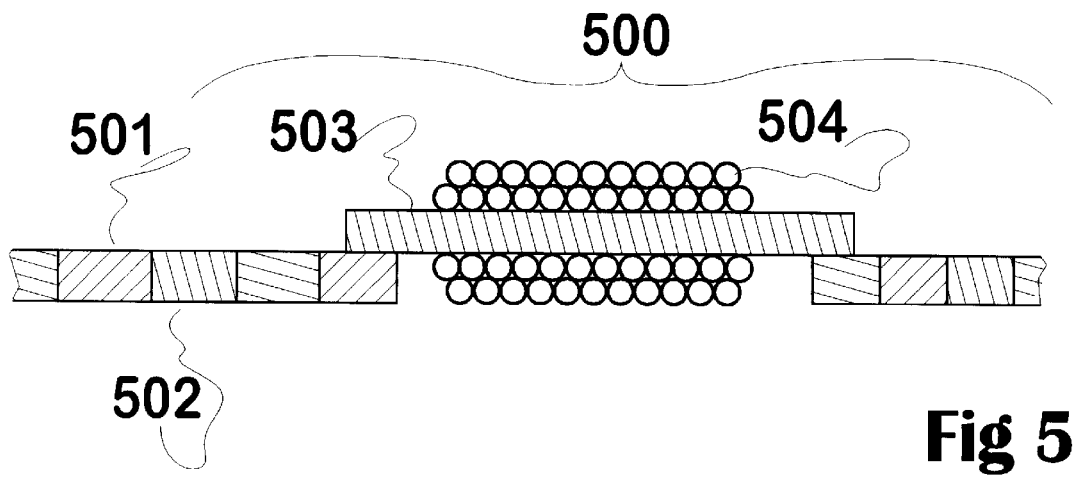
FIG. 5: is a section along a ferrite core showing one secondary winding in place.

FIGS. 4 (in perspective) and 5 (in section) illustrate a magnetizable core made up from the above modules or fingers, and slabs. FIG. 4 shows an array of ferrite elements. 401 and 402 are typical fingers (see also 501 and 502 in FIG. 5) and 403 (also 503 in FIG. 5) is a larger slab, preferred as a core for the actual secondary winding 504 (of which more than one may exist—see FIG. 12 for instance).

A flux concentrator suitable for use in an inductively coupled vehicle would comprise a number of cores according to the description above. Each core of our preferred dimensions can provide about 500 W of electric power before reaching a limit caused by core saturation. One core and its windings tends to interact with windings of other cores. Placement of cores over that surface of a vehicle to be adjacent to the primary conductors is the subject of conflicting constraints. On the one hand a widely scattered formation is preferred to collect useful flux even if lateral positioning is poorly controlled, while on the other hand if more cores can collect a high level of flux the total power collected is greater—assuming that the relative positioning of the vehicle to the primary conductive pathway is more precise. Core positioning is also constrained by the total surface available. If the total power from coils is not sufficient for brief peak loading conditions, power reserve elements such as capacitors of some farads capacity, a high-inertia dynamotor, or batteries may be used to supply extra power. Alternatively larger cores can be used to raise the flux density before saturation.

Figure 8:
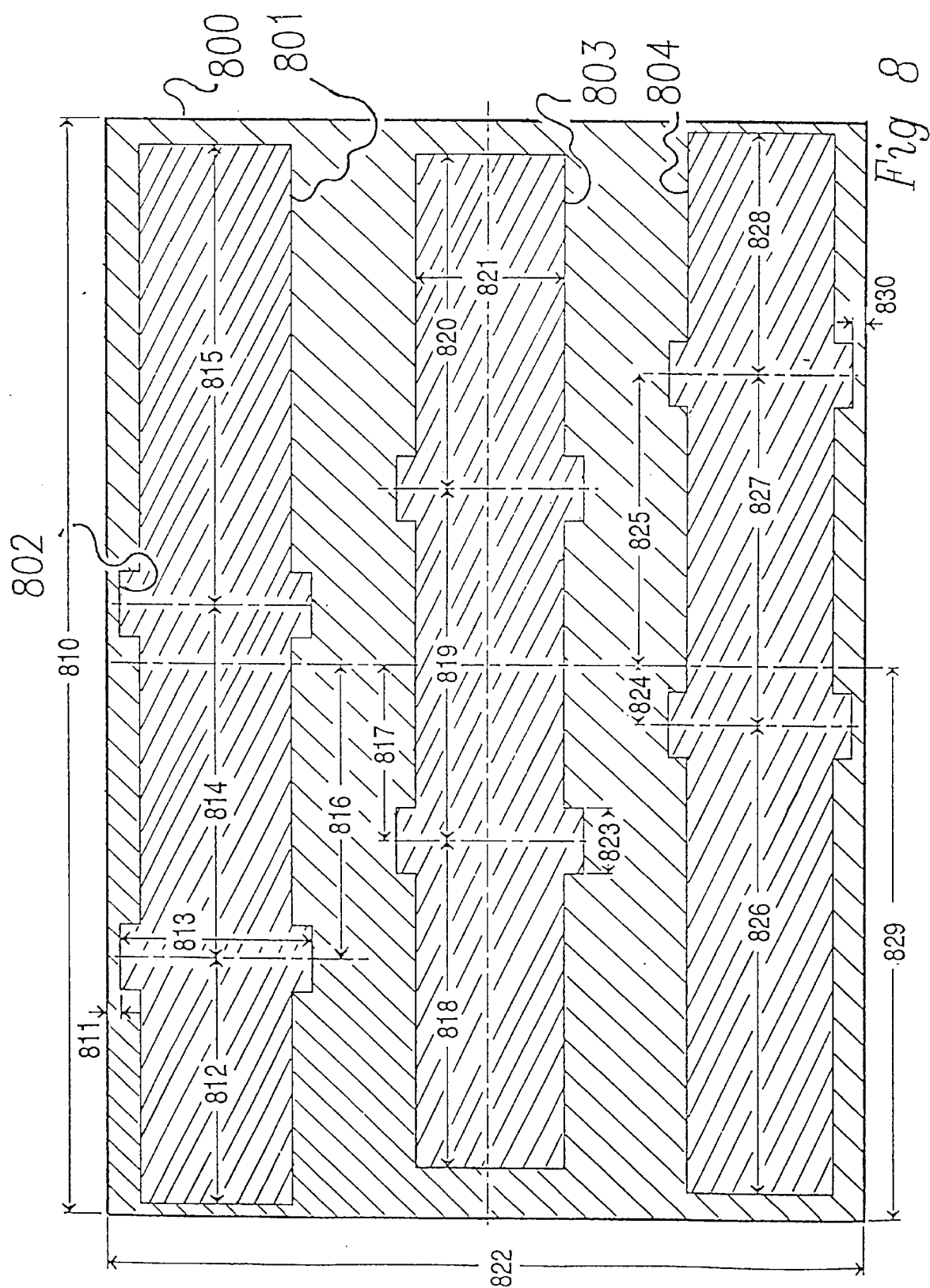
FIG. 8: is an illustration to show the placing of cores and coils as they would be installed beneath a vehicle.

One preferred layout for three cores and six coils is shown in FIG. 8. Numerals 810 to 830 inclusive refer to the table of dimensions below. The figure shows a plate 800 milled out with shallow troughs to hold a set of three cores and the three coils associated with each winding. Dimensions are in millimeters. The shorter axis is placed at right angles to the usual direction of primary conductors when the plate is in use. Three shallow channels 801, 803 and 804, each including two wider sections (e.g. 802) for accommodating coils, are shown. Note that the pairs of coils are offset from each other so that the total width effectively covered by any one coil is over 500 mm. The dimensions in this figure are given by way of example only.

TABLE 1

Dimensions for FIG. 8

| | | | |
|---|---|---|---|
| 810 | 900 mm | 821 | 118 mm |
| 811 | 10 mm | 822 | 600 mm |
| 812 | 199 mm | 823 | 54 mm |
| 813 | 148 mm | 824 | 49 mm |
| 814 | 290 mm | 825 | 241 mm |
| 815 | 380 mm | 826 | 380 mm |
| 816 | 241 mm | 827 | 290 mm |
| 817 | 145 mm | 828 | 199 mm |
| 818 | 266 mm | 829 | 450 mm |
| 819 | 290 mm | 830 | 10 mm |
| 820 | 276 mm | | |

This example plate would be suitable for a small personal conveyance similar in size to a dodgem car. "Tufnol"—the material preferred for at least prototype core mounting plates 800—is a machinable composite material comprised of phenolic resin impregnated into layers of fabric. Other plastics, or wood, or resin-impregnated wood, or other non-conductors can be used as an alternative core mount. As the array of ferrite fingers forming a core has some tolerance to flexion (unlike a single ferrite slab) total rigidity of the mount even under impact is not required.

We prefer to use a layer of conducting medium a small distance above (on the far side from the primary conductors) the array of coils to restrict the flux to the area of the coils and enhance their effectiveness and operation. A suitable material is a plate of aluminium, 5 mm thick and a similar size to that of the "Tufnol" plate, placed about 10 mm above the highest part of any secondary winding. Preferably this plate has no surface defects such as deep scratches that might obstruct skin-effect induced currents.

Details—Pick-Up Coil Controller

Figure 7:
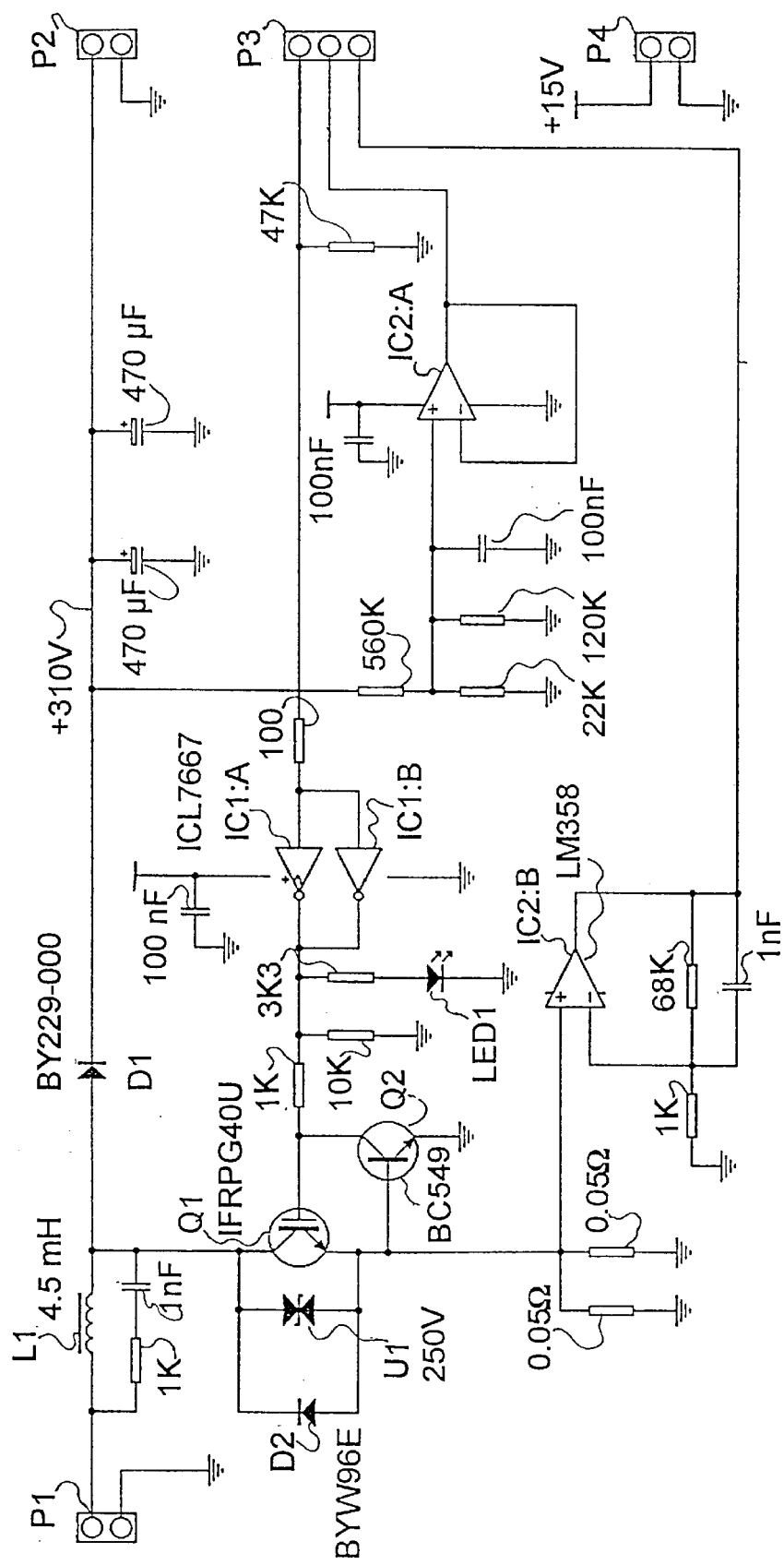
FIG. 7: is a circuit diagram for a pick-up coil controller for the vehicle of FIG. 13.

The pick-up coil controller shown in FIG. 7 has the simple functions of (a) shorting out the coil, (b), reporting the short-circuit current, and (c) reporting the output bus voltage.

Connector P1 receives an already rectified input from the resonant coil, which input is filtered through L1 and taken to the insulated gate bipolar transistor (IGBT) Q1, preferably type IFRPG40U. If the transistor is ON, current passes to ground and returns to the coil via connector P1, passing through a paralleled pair of current sense resistors, here 0.05 ohms in value. These resistors are placed across the (+) input of a ground-referenced voltage amplifier, IC2:B, type LM358. The output of this amplifier passes to the microprocessor's A–D inputs (using line 611 in FIG. 6) via connector P3. The transistor Q1 is caused to go ON by means of a nominally 5V logic pulse arriving from connector P3 to the paralleled IGBT driver device, IC1:A and IC1:B, type ICL 7667. The outputs are taken to the base of the IGBT. Current clamping means (Q2) and an indicator light-emitting diode are provided. The IGBT has a reverse diode D2 and a surge protector U1 (250V) wired between its emitter and its collector.

Figure 6:
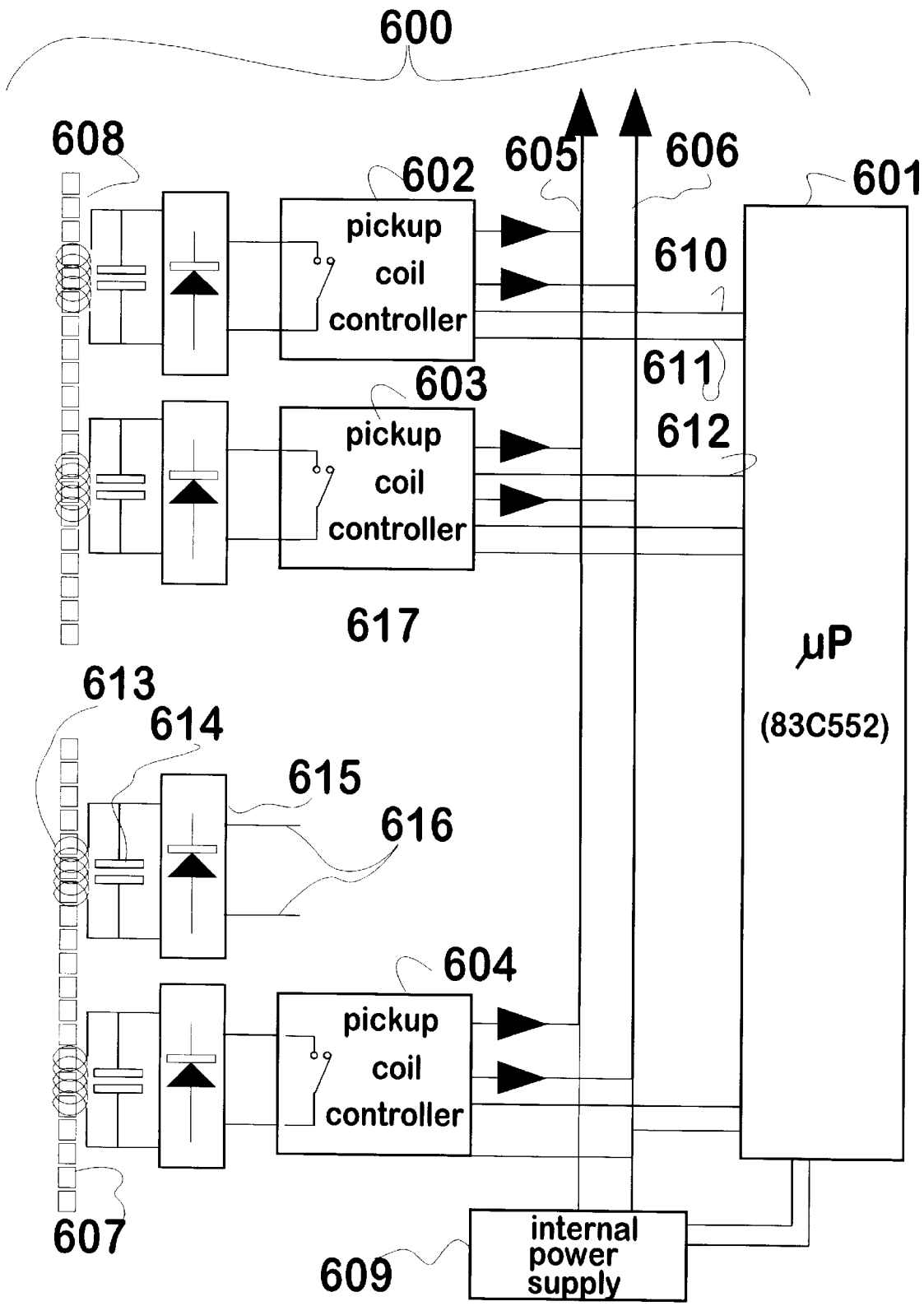
FIG. 6: is a wiring diagram for an IPT controller for the vehicle of FIG. 13.

Only one of the usually six modules, some of which are shown in FIG. 6, would usually be fitted with a bus voltage monitor as shown here. The nominally 310V DC line running across the top of the circuit is divided through the 560K resistor and the paralleled 22K and 120K resistors at the positive input to IC2:A wired as a voltage follower. The output is led through connector P3 to the main microprocessor or controller. The 310V DC line is provided with 940 microfarads of filtering capacitor and includes a steering diode D1 (type BY229-000) to provide a kind of wired-OR summing of the output power from whichever coils are selected for power transfer at any moment by being in the not shorted state. Different arrays under the same vehicle are likely to be in phase.

Inductive Power Transfer (PT) Controller

The wiring diagram of FIG. 6 shows an IPT controller 600 comprising a microprocessor-driven unit 601 together with a number of pick-up coil controllers of which three out of six are shown (602, 603, 604). Each pick-up coil controller (see FIG. 7 for a circuit diagram) accepts raw DC power along lines such as 616 from individual secondary resonant coil modules each having a coil 613, a capacitor 614 and a rectifier 615. The capacitor 614 may actually be a bank of capacitors in parallel. A one-microfarad unit is preferred for the bank because cooling is facilitated by using many small modules rather than one bulky capacitor. Cooling is preferred because of heat buildup due to dielectric losses at 10 KHz and electrode losses at often 30 or 40 A circulating current.

Several (usually two) coils may share a common ferrite core 607, 608. (A third 10 core/controller set is not shown for clarity). The controller is instructed to maintain an output of 320 volts on the buses 505 and 506, and a wire-OR connection from the three selected coils (using either coil on a given core) on the three cores of the preferred embodiment provides this, assuming that the vehicle is in suitable proximity to the primary conductors and the instantaneous current demand is not too heavy.

The controller may short both coils of a given core if the output voltage rises above about 320 volts.

The preferred microprocessor in the microprocessor driven unit 601 is one including a number of analogue-to-digital (A–D) converter inputs. Conveniently a "Philips" or second-sourced 83C552 is used as this has eight inputs and ample capacity for programming. A power supply 609 provides internal power for the microprocessor and for other electronic modules. One A–D input (e.g. 611) samples the short-circuit current from a corresponding one of six resonant secondary coil units, indicating the magnitude of the magnetic flux passing through that coil, and a single input (612) samples a suitably divided sample of the output voltage. A buffered output port 610 provides control voltages to the shorting switches. The conventional microprocessor circuit includes the usual latch for addressing a read-only program memory.

Figure 9:
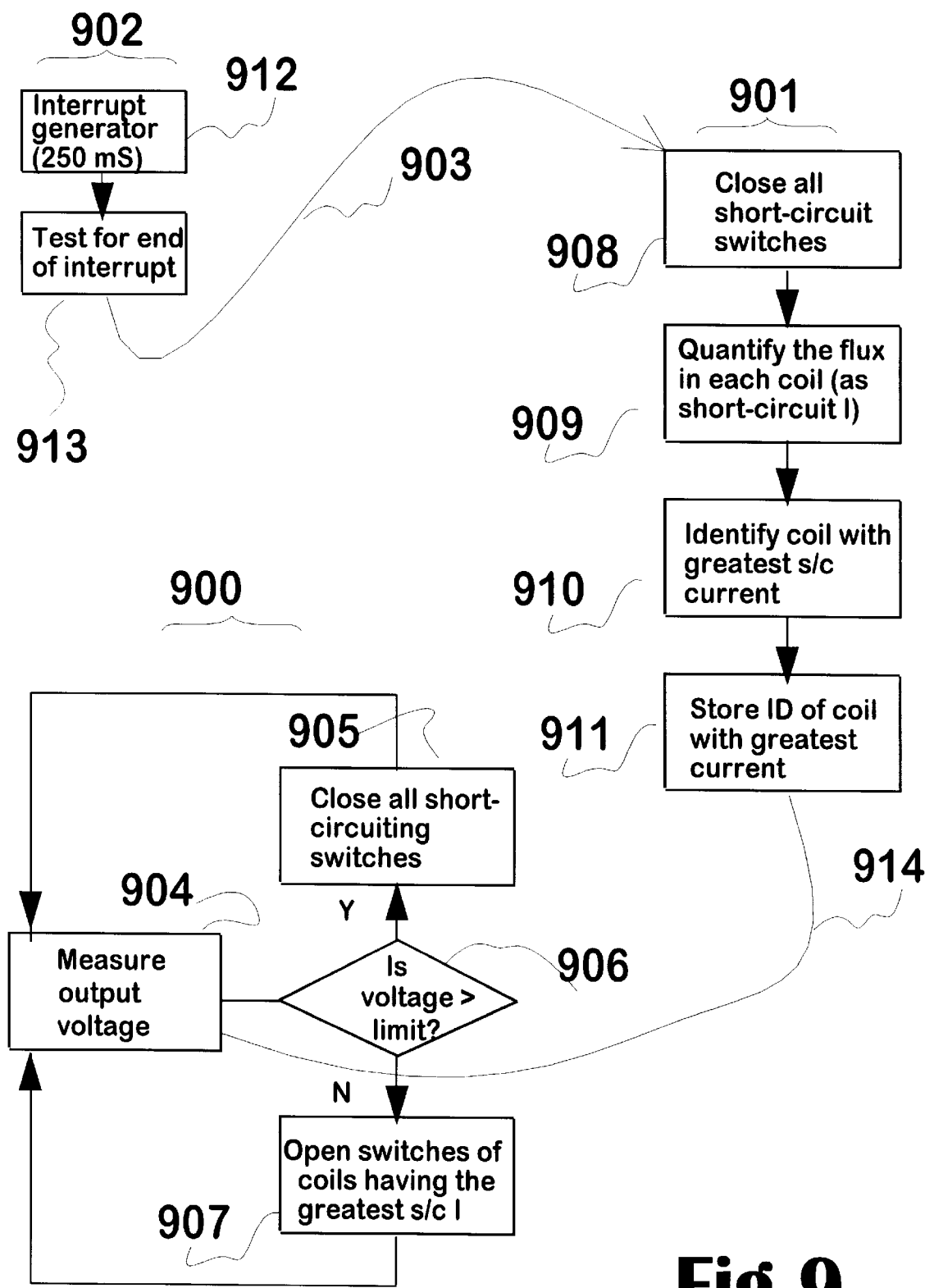
FIG. 9: is a block diagram for instructions for estimating the position of the primary conductor in relation to the array of secondary coils for the controller of FIG. 6.

The operating algorithm is relatively simple and comprises two tasks; one subsidiary to the other. Various improvements may be made; for example providing duplication or instituting error checking in case of failure. A–D inputs for example are prone to fail if overloaded even briefly. FIG. 9 is a flow chart illustrating these tasks.

Main task: (900)
1. Measure the output voltage (904).
2. Test the voltage (906) If the voltage is above a lower limit, then close all short-circuit switches (905).
3. Else if the voltage is below an upper limit, open those switches recorded (see below) as having the greatest short-circuit current (907).

4. Return to (1).

Options include a reversion to battery backup power to boost the output voltage if inductive power transfer is insufficient.

A subsidiary task 901, which should be executed periodically (for instance several times a second):

1. Close all short-circuit switches (908).
2. For each coil, measure and record the present flux, as indicated by the short-circuit current sensed as a voltage (909).
3. For each array on its core, record in memory the coil having the greater (or greatest) current (910). (This task is linked to the main one through the information it deposits in memory—suggested by the connection 914).

This subsidiary task can be run as an interrupt, initiated by a timer interrupt event, 902, including the usual steps of (a) setting up an interrupt timer at 912 and (b) testing for completion of the time (913)

whereupon an interrupt 903 initiates the subsidiary task. There is also room for a further subsidiary task, namely reporting on the position of the primary conductor in relation to the several arrays of magnetic cores.

1. Consider (i.e. rank or enumerate) the records of short-circuit currents using the memory information 914 for instance.
2. Using (a) constants reflecting the disposition of coils beneath the vehicle and (b) the instant records of short-circuit currents.
3. derive the apparent primary conductor mean position.
4. Report the position as character strings to a navigation control device through a communications channel—I²C or RS-232 serial channels for example. Preferably this channel is optically isolated and then it is simpler to isolate the RS-232 serial channel.

Derivation of apparent primary position might for example take the form of assessing the relative proportion of flux in each coil along one array or magnetic core, to provide the position beneath that core, and then considering all cores in order to estimate the direction.

Another derivation procedure uses fuzzy logic principles and this is preferred as it is better able to cope with loss of function by one or more individual coils.

Reporting of position is useful to a vehicle steering or navigation unit, which may for example be empowered to force the vehicle onto a track it if deviates by too much, or which may guide art automatically guided vehicle along a warehouse floor.

Options

As the maximum power from any coil is limited by saturation of the ferrite core (in this example slightly over 500 W, extra power can be obtained by increasing the cross-sectional area amount of ferrite—either by using thicker fingers in an array or by installing more arrays.

Surges of power can be provided from a battery backup or a capacitor bank.

Advantages

Using our preferred flux concentrator, the volume from which power-carrying flux can be enlarged while the size of the pick-up structure remains small.

The distance from primary to secondary can be extended.

Large monolithic ferrite structures are too brittle to be usable for pick-up coils for inductive power transfer, but by fingering them they gain some flexibility and become much easier to use and are more robust.

By using multiple coils the observed secondary-coil currents indicate which coils to select to obtain power.

Also by using multiple coils the observed secondary-coil currents can be used to determine the position of the flux concentration system relative to the track and hence can be used for guidance.

The primary conductors can be buried deeper in a substrate and so removed from proximity to damage to themselves or to inadvertently causing high induced currents in nearby articles.

By using a horizontal field from a pair of conductors below a surface instead of using a vertical field, allows for greater flexibility in design and greater mobility of the vehicle relative to the placement of the conductors. The horizontal field has a null output between the wires. The pick-up coils can be much smaller than those using a vertical field and have much smaller circulating currents in them. The horizontal field also allows for multiple coils giving much better misalignment performance than for a vertical field.

The pick-up coil winding is a great deal shorter, and in particular has far less non-functional length over that of an air-cored version.

The pick-up coil is now compact enough for replacement by a superconducting coil, should the economics of superconductivity provide a material improvement in efficiency.

Finally, it will be appreciated that various alterations and modifications may be made to the foregoing without departing from the scope of this invention as set forth in the following claims.

We claim:

1. Inductive power pick-up means comprising at least one secondary conductor winding about a magnetizable core capable of collecting a magnetic flux from a nearby elongate primary conductor having a primary axis, wherein the magnetizable core has a length, which in use tends to be oriented at right angles to the primary axis of the primary conductor, a width, and a thickness; at least part of the magnetizable core comprises two or more fingers of a ferrite material; each said finger having at least one substantially flat side for making close contact with an adjacent said finger, the fingers being laid side by side across the length of the magnetizable core in an array wherein the flat sides of the fingers are held in close contact with one another by a compliant force exerting a compression force along the length of the magnetizable core, so that a permeability of the magnetizable core is substantially similar to that of a single mass of ferrite material of similar dimensions, yet because the fingers are capable of moving against one another, the array is capable of at least partially resembling a flexible magnetizable core capable of undergoing distortion without permanent loss of function.

2. Inductive power pick-up means as claimed in claim 1, wherein the core comprises more than one set of the fingers, each said set of fingers being spaced apart from an adjacent said set of fingers, and each said set of fingers being magnetically connected to an adjacent said set of fingers by means of a bridge of ferrite material.

3. Inductive power pick-up means as claimed in claim 2, wherein each said bridge comprises a slab of ferrite material.

4. Inductive power pick-up means as claimed in claim 3, wherein each said secondary conductor is wound around a respective said bridge.

5. Inductive power pick-up means as claimed in claim 4, wherein each said slab contacts at least one of the fingers from each said adjacent set of fingers.

6. Inductive power pick-up means as claimed in claim 4, wherein each said slab is connected to a pair of bars, one said bar being at each end of said slab, with each said bar contacting at least one of the fingers from a respective said set of fingers.

7. Inductive power pick-up means as claimed in claim 4, wherein each said set of fingers has at least four said fingers of ferrite material.

8. Inductive power pick-up means as claimed in claim 4, wherein each said finger is comprised of a ferrite material having a relative magnetic permeability of at least 1000.

9. Inductive power pick-up means as claimed in claim 1, wherein more than one pick-up coil is provided on a single said core.

10. Inductive power pick-up means as claimed in claim 9, wherein each said pick-up coil is tuned with an associated resonating capacitor and each said pick-up coil has its own rectifier to produce a DC output.

11. Inductive power pick-up means as claimed in claim 1, wherein a conducting sheet is positioned on a side of the magnetic core away from the primary conductor.

12. Inductive power pick-up means as claimed in claim 1, wherein each said finger is as thick as the thickness of the magnetizable core, and each finger is as long as the magnetic core is wide.

* * * * *